United States Patent [19]

Birch et al.

[11] Patent Number: 5,220,233

[45] Date of Patent: Jun. 15, 1993

[54] DYNAMOELECTRIC MACHINES

[75] Inventors: Peter H. Birch; Alan B. Turner; Toshiyuki Kondo, all of Brighton, United Kingdom; Katsuhiro Mori, Aichi, Japan

[73] Assignee: Aisin Seiki Kabushiki Kaisha, Kariya, Japan

[21] Appl. No.: 327,603

[22] Filed: Mar. 23, 1989

[30] Foreign Application Priority Data

Mar. 31, 1988 [GB] United Kingdom ............... 8807663

[51] Int. Cl.$^5$ .................... H02K 21/12; H02K 9/19; H02K 1/22

[52] U.S. Cl. ...................... 310/156; 310/52; 310/54; 310/261

[58] Field of Search .............. 310/52, 54, 58, 60 A, 310/261, 262, 156

[56] References Cited

U.S. PATENT DOCUMENTS

| | | | |
|---|---|---|---|
| 3,567,975 | 3/1971 | Biesack | 310/54 |
| 3,735,174 | 5/1973 | Bösch et al. | 310/54 |
| 3,858,308 | 1/1975 | Peterson | 310/156 |
| 3,968,390 | 7/1976 | Yasuda et al. | 310/156 |
| 4,433,261 | 2/1984 | Nashiki et al. | 310/156 |
| 4,454,438 | 6/1984 | Yamashita et al. | 310/156 |
| 4,517,479 | 5/1985 | Aleem et al. | 310/54 |
| 4,674,178 | 6/1987 | Patel | 310/156 |

FOREIGN PATENT DOCUMENTS 1039002  8/1983  U.S.S.R. ........................ 310/262

Primary Examiner—Steven L. Stephan
Assistant Examiner—C. LaBalle
Attorney, Agent, or Firm—Burns, Doane, Swecker & Mathis

[57] ABSTRACT

A high speed rotating electromagnetic motor/generator includes a rotor having a core of magnetic material, a layer of permanent magnet, a retainer ring and side walls of non-magnetic material. A stator is provided by magnetic steel laminations and winding slots. A case includes a cylindrical inner casing, a cylindrical outer casing and end caps which carry the machine bearings. The permanent magnets within the rotating part may be made of neodymium-boron-iron and produce a high flux density pole rotor. The motor/generator can be operated as a brushless direct current or synchronous alternating current machine. Efficient means of cooling is provided by helical channels, which carry a liquid coolant, and are formed in the casing.

10 Claims, 2 Drawing Sheets

DYNAMOELECTRIC MACHINES

FIELD OF THE INVENTION

The invention relates to dynamoelectric machines, that is, electrical generators and motors.

DESCRIPTION OF THE RELATED ART

The rotors of permanent magnet (pm) dynamoelectric machines are conventionally constructed from high magnetic field strength permanent magnetic materials which tend to have a low tensile strength which inhibits the maximum operating speed of the machine. At high rotational speeds, the tensile stresses induced in the rotor by the resultant centrifugal forces may exceed the limit permitted for the magnetic material and consequently cause damage to the machine.

Proposals have been made for permanent magnet dynamoelectric machines which operate at high maximum speeds. However, these machines tend to have relatively low power ratings because they require small diameter rotors to alleviate centrifugal stresses, and have a low mean air gap flux density as a result of the reduced depth of the rotor magnet.

Heat generation and dissipation in and from the stator can also restrict the performance of the machine at high speed. The temperature of the machine is generally controlled by means of air cooling and must be able to provide a sufficient cooling capability for the power rating. Accordingly, the power rating to volume ratio of a given machine is increased.

High speed motors and generators can increase their power ratings by reducing internal stresses and hence increasing the rotational speed, increasing the average magnetic flux density for a pole, and by providing more efficient means of dissipating heat generated during operation of the motors and generators.

SUMMARY OF THE INVENTION

The invention provides a dynamoelectric machine having a rotor, a laminated stator, winding slots in the stator, a cylindrical inner casing surrounding the stator, channels helically arranged in the outer surface of the inner casing for conducting cooling liquid, an outer casing enclosing the channels, and end caps for supporting the machine bearings.

The rotor of the invention includes at least a magnetic core, a permanent magnet sleeve, a retaining sleeve, and non-magnetic side walls, or may include a magnetic core, a permanent magnet inner sleeve, an inner retaining sleeve, a permanent magnet outer sleeve, an outer retaining sleeve and non-magnetic side walls.

The apparatus employs a rotor of permanent magnet design whereby the magnets are contained within the rotor in such a way as to minimize component stress while maximizing the average magnetic flux density per pole.

Dissipation of heat is effected in an efficient manner by helical channels formed on the outside surface of the inner casing of a two cylinder casing. The channels are flooded with a cooling liquid, such as water, and are designed to allow just the minimum amount of coolant necessary to completely dissipate all of the generated heat, while maintaining an axially symmetrical temperature in the casing.

DETAILED DESCRIPTION OF THE PREFERRED EMBODIMENTS

Figure 1:
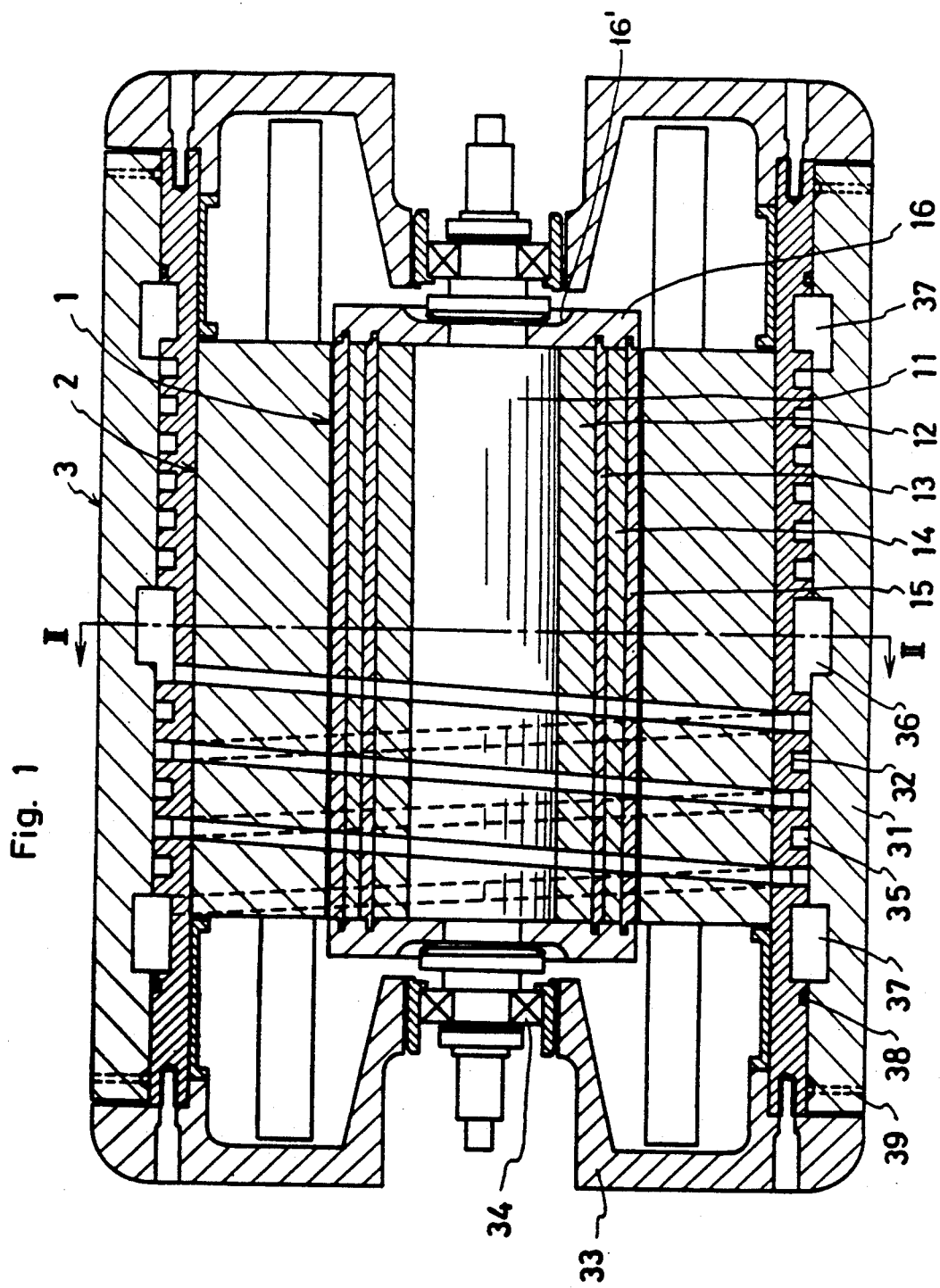
FIG. 1 shows a longitudinal sectional view of a dynamoelectric machine according to the invention.
Figure 2:
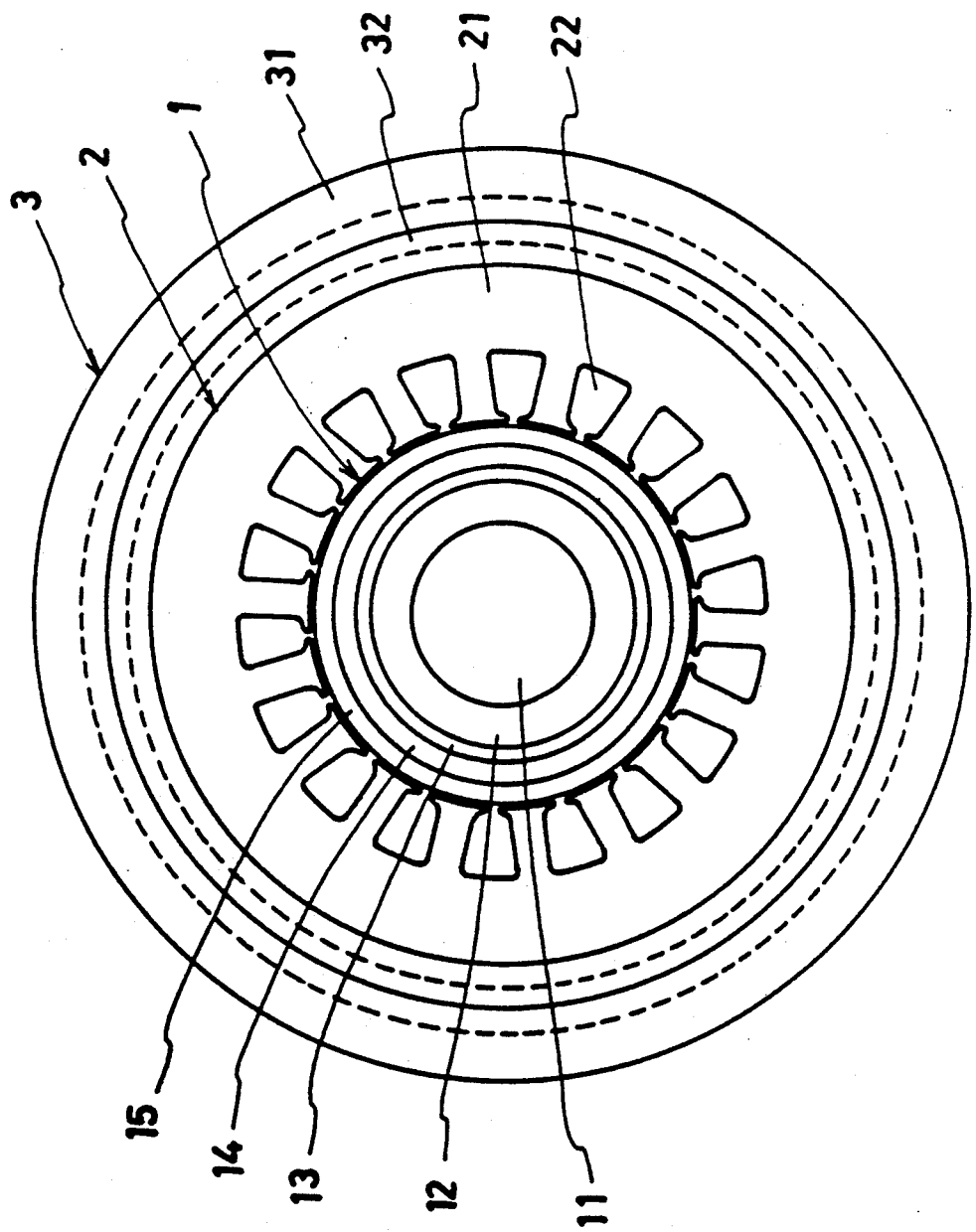
FIG. 2 shows a cross sectional view along the line II—II of FIG. 1.

With reference to FIGS. 1 and 2, a rotor 1 has a high strength magnetic alloy core 11, non-magnetic alloy side walls 16, and circumferentially arranged about the core 11 an inner permanent magnet sleeve 12, an inner retaining sleeve 13, an outer permanent magnet sleeve 14, and an outer retaining sleeve 15. As raw material of sleeves 13 and 15, metallic or fiber-composite material may be utilized to fabricate the sleeves.

During high speed rotation of the rotor 1, each of the sleeves 12, 13, 14 and 15 is subjected to very high, and possibly damaging, tensile stresses. The inner permanent magnet sleeve 12 is supported by the inner retaining sleeve 13, while the outer permanent magnet sleeve 14 is supported by the outer retaining sleeve 15. The inner retaining sleeve 13 is interposed between the permanent magnet sleeves 12 and 14 to restrain the sleeve 12 and prevent centrifugal force, exerted by the sleeve 12, from acting on the permanent magnet sleeve 14. Thus, dangerous loading and possible damage to the outer retaining sleeve 15 is avoided. The inner and outer permanent magnetic sleeves are made from a suitable material. In the present embodiment, the material may be neodymium-iron-boron.

The distance between the exposed material of the sleeve 15 and the stator 2 is minimized so as to maintain high machine efficiency.

The side walls 16 are provided in the form of discs having a central hole or opening for locating the core 11. On the side of the discs in contact with the sleeves 12, 13, 14 and 15, two annular grooves are provided which locate the inner retaining sleeve 13 and the outer retaining sleeve 15. Precise location of the retaining sleeves and the side walls 16 ensures that the structure maintains its rigidity.

At high rotational speeds the expansion caused by centrifugal forces and the pressure exerted by the permanent magnet sleeves 12, 14 causes translation movement of the retaining sleeves 13, 15. In the region of contact with the side walls 16, the translation of the retaining sleeves 13, 15 can cause damaging tensile stresses to occur in both the retaining sleeves 13, 15 and the side walls 16. These stresses are relieved by scalloping the face of the side wall 16 not in contact with the sleeves 12, 13, 14 and 15 in a region adjacent to the core 11. The scallop 16 is clearly depicted in FIG. 1.

The core 11 is supported by bearings 34 which are in contact with the casing end caps 33.

The electromagnetic stator 2 is provided by laminated steel 21 and winding slots 22. The outer surface of the stator 2 is in close contact with the inside surface of the inner casing 32.

Helical channels 35 formed on the outside surface of the inner casing 32 are flooded and continually supplied with a cooling liquid such as water. The cooling liquid is introduced into the casing 32 through an inlet cavity 36 which is located in a position which axially bisects the stator 2. The cooling liquid flows through the helical channels 35 into outlet cavities 37 located in a position coincident with each end of the stator. 'O' ring seals 38 prevent leakage of coolant from between the inner casing 32 and the outer casing 31. If any fluid should leak past the 'O' ring seals 38, a small scupper or opening 39 is located within the outer casing 31, beyond the seals 38, as depicted in FIG. 1 so as to drain any fluid which may leak past the seals.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A dynamoelectric machine comprising a rotor, a laminated stator, winding slots in the stator, a cylindrical inner casing having an outer surface and surrounding the stator, an outer casing circumferentially surrounding the inner casing, and casing end caps supporting bearings of the machine and at least a portion of said rotor; said rotor including a magnetic core, a permanent magnet inner sleeve, an inner retaining sleeve, a permanent magnet outer sleeve, an outer retaining sleeve and non-magnetic side walls.

2. A dynamoelectric machine according to claim 1 further comprising a cooling liquid inlet cavity located axially centrally of the stator, and cooling fluid outlet cavities located at ends of the stator.

3. A dynamoelectric machine according to claim 1 wherein the permanent magnet sleeve is made from a neodymium iron-boron magnet.

4. A dynamoelectric machine according to claim 1 wherein said side walls are scalloped to allow translational movement of the side walls to coincide with translational movement of the retaining sleeves.

5. A dynamoelectric machine according to claim 1 wherein the permanent magnet sleeve is made from a neodymium- iron-boron magnet.

6. A dynamoelectric machine according to claim 1 wherein said side walls are scalloped to allow translational movement of the side walls to coincide with translational movement of the retaining sleeves.

7. A dynamoelectric machine comprising a rotor, a laminated stator, winding slots in the stator, a cylindrical inner casing having an outer surface and surrounding the stator, a plurality of channels helically arranged in the outer surface of the inner casing for conducting cooling liquid through said channels, an outer casing circumferentially surrounding the inner casing and enclosing the channels, and casing end caps supporting bearings of the machine and at least a portion of said rotor;
 wherein the rotor further comprises a magnetic core, a permanent magnet inner sleeve, an inner retaining sleeve, a permanent magnet outer sleeve, an outer retaining sleeve and non-magnetic side walls.

8. A dynamoelectric machine according to claim 7 wherein the permanent magnet sleeves are made from a neodymium- iron-boron magnet.

9. A dynamoelectric machine according to claim 7 wherein said side walls are scalloped to allow translational movement of the side walls to coincide with translational movement of the retaining sleeves.

10. A dynamoelectric machine comprising a rotor, a laminated stator, winding slots in the stator, a cylindrical inner casing having an outer surface and surrounding the stator, a plurality of channels helically arranged in the outer surface of the inner casing for conducting cooling liquid through said channels, an outer casing circumferentially surrounding the inner casing and enclosing the channels, and casing end caps supporting bearings of the machine and at least a portion of said rotor, a cooling liquid inlet cavity located axially centrally of the stator, and cooling fluid outlet cavities located at ends of the stator;
 wherein the rotor includes a magnetic core, a permanent magnet inner sleeve, an inner retaining sleeve, a permanent magnet outer sleeve, an outer retaining sleeve and non-magnetic side walls.

* * * * *